United States Patent
Neidhardt et al.

(10) Patent No.: US 9,391,719 B2
(45) Date of Patent: Jul. 12, 2016

(54) METHOD AND A SYSTEM FOR DETERMINING THE PLACE OF ORIGIN OF PASSIVE INTERMODULATION PRODUCTS

(75) Inventors: Steffen Neidhardt, Dorfen (DE); Christian Evers, Kirchheim (DE)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 631 days.

(21) Appl. No.: 13/695,948

(22) PCT Filed: Jul. 29, 2011

(86) PCT No.: PCT/EP2011/063064
§ 371 (c)(1),
(2), (4) Date: Nov. 2, 2012

(87) PCT Pub. No.: WO2012/038126
PCT Pub. Date: Mar. 29, 2012

(65) Prior Publication Data
US 2013/0054169 A1  Feb. 28, 2013

(30) Foreign Application Priority Data
Sep. 21, 2010  (DE) .......................... 10 2010 046 099

(51) Int. Cl.
*G06F 19/00* (2011.01)
*H04B 17/00* (2015.01)

(52) U.S. Cl.
CPC ................................. *H04B 17/0085* (2013.01)

(58) Field of Classification Search
USPC .......................................................... 702/69
See application file for complete search history.

(56) References Cited

U.S. PATENT DOCUMENTS

| 6,144,692 A | 11/2000 | Beck |
| 2010/0164504 A1* | 7/2010 | Bradley ........................ 324/520 |

FOREIGN PATENT DOCUMENTS

WO     WO 00/57571 A1     9/2000

OTHER PUBLICATIONS

Justin Henrie describes in (Jan. 2008) Prediction of Passive Intermodulation From Coaxial Connectors in Microwave Networks that Coaxial connectors are frequently the dominant contributors to passive intermodulation (PIM) distortion in high-frequency networks, pp. 209-216, IEEE Transactions on Microwave Theory and Techniques, vol. 56, No. 1.*

(Continued)

Primary Examiner — Tung S Lau
(74) Attorney, Agent, or Firm — Ditthavong & Steiner, P.C.

(57) ABSTRACT

A method for determining the place of origin of a passive intermodulation product excites a distributed device under test with two first excitation signals ($x_1(t)$, $x_2(t)$), each with a single spectral line, of which the frequencies ($f_1$, $f_2$) provide a frequency spacing relative to one another. Following this, the phase ($\phi_{IM3Meas}$) of a first passive intermodulation product generated at the place of origin in the distributed device under test from the first excitation signals (($x_1(t)$, $x_2(t)$) by nonlinear distortion is measured, and the delay time of the first passive intermodulation product from the place of origin to the measuring device is calculated from the measured phase ($x_1(t)$, $x_2(t)$) and the frequency ($2 \cdot f_1 - f_2$) of the first passive intermodulation product. Finally, the place of origin of the passive intermodulation product is determined from the delay time and the topology of the distributed device under test.

19 Claims, 3 Drawing Sheets

(56) References Cited

OTHER PUBLICATIONS

International Preliminary Report on Patentability corresponding to Application No. PCT/EP2011/063064, issued on Mar. 26, 2013.
Written Opinion of the International Searching Authority corresponding to Application No. PCT/EP2011/063064, mailed on Oct. 6, 2011.
Bamidele Adebisi et al.: "Wire integrity testing using intermodulation product processing" Power Line Communications and Its Applications, Apr. 2008. pp. 213-217.
Christianson, A.J., et al: "Higher Order Intermodulation Product Measurement of Passive Components", IEEE Transactions on Microwave Theory and Techniques, vol. 56, No. 7, Jul. 2008, pp. 1729-1736.
Dmitry E Zelenchuck et. al: "Passive Intermodulation in Finite Lengths of Printed Microstrip Lines", IEEE Transactions on Microwave Theory and Techniques, vol. 56, No. 11, Nov. 2008, pp. 2426-2434.
International Search Report for PCT/EP2011/063064 mailed Oct. 6, 2011.
Justin Henrie, et al.: "Prediction of Passive Intermodulation from Coaxial Connectors in Microwave Networks", IEEE Transactions on Microwave Theory and Techniques, vol. 56, No. 1, Jan. 2008, pp. 209-216.

\* cited by examiner

METHOD AND A SYSTEM FOR DETERMINING THE PLACE OF ORIGIN OF PASSIVE INTERMODULATION PRODUCTS

CROSS-REFERENCE TO RELATED APPLICATION

The present application is a national phase application of PCT Application No. PCT/EP2011/063064, filed on Jul. 29, 2011, and claims priority to German Application No. DE 10 2010 046 099.0, filed on Sep. 21, 2010, the entire contents of which are herein incorporated by reference.

BACKGROUND OF THE INVENTION

1. Field of the Invention

The invention relates to a method and a system for determining the place of origin of passive intermodulation products in devices under test.

2. Discussion of the Background

If passive component groups, for example, plug connectors, cables and antennas, are supplied by two high-frequency signals, passive intermodulation products occur at places with a non-linear transmission characteristic because of the effect of the nonlinear distortion. Such places with a nonlinear transmission characteristic are, for example, contaminated or oxidized points within the conductive material, magnetic materials in the conduction pathway, transitions between various metals, geometric inhomogeneities in the conduction path, for example, metallic chips at metal edges.

If these passive intermodulation products occur in the frequency range of the transmission system, they lead to undesired interference in the receiver, which can render a correct decoding or detection of the transmitted payload data difficult or impossible.

A measuring method is known from US 2010/0164504 A1, in which one of the two excitation signals is swept. However this has not proved successful in practice.

SUMMARY OF THE INVENTION

Embodiments of the invention advantageously provide a method and a system for determining the exact place of origin of passive intermodulation products in distributed devices under test with regard to a removal of the interfering non-linearity in the distributed device under test on this basis.

According to embodiments of the invention, the distributed device under test is supplied with two purely sinusoidal excitation signals (continuous wave signals, CW signals), of which the frequencies provide a given frequency spacing. Through the excitation of the distributed device under test, a passive intermodulation product occurs at the non-ideaiality of the distributed device under test, which is reflected and/or transmitted at the place of origin. By measuring the phase of the passive intermodulation product with a measuring device, at the input terminal of the distributed device under test in the case of the reflection of the passive intermodulation product, or at the output terminal of the distributed device under test in the case of the transmission of the passive intermodulation product, with a known frequency and known phase of the passive intermodulation product at the place of origin, the delay time of the passive intermodulation product from the place of origin to the measuring device is determined. From the known topology of the distributed device under test, using the determined delay time of the passive intermodulation product, an inference is drawn regarding the place of origin of the passive intermodulation product.

The passive, third-order intermodulation product, which is obtained by subtracting the doubled frequency of the one excitation signal and the single frequency of the other excitation signal ($f_{IM3}=2 \cdot f_2 - f_1$, wherein $f_1$ and $f_2$ are the frequencies of the two excitation signals), is typically measured as the passive intermodulation product. Any other arbitrary intermodulation product can be used in exactly the same manner and is also covered by the invention.

In a first embodiment of the invention, the phase of the passive intermodulation product can be determined at the place of origin of the passive intermodulation product. The phase of the passive intermodulation product at the place of origin of the passive intermodulation product is obtained from the phases of the two excitation signals at the place of origin of the passive intermodulation product, which are disposed centrally relative to the measurable phases of the generated excitation signals upon generation and the measurable phases of the reflected excitation signals at the non-ideality of the distributed device under test upon arrival in the measuring device.

In a second embodiment of the invention, the phase of the passive intermodulation product at the place of origin of the passive intermodulation product is not determined. Instead, the distributed device under test is supplied for a second time with two purely sinusoidal excitation signals, of which the frequencies are different from the frequencies at the first excitation and of which the frequency spacing is identical to the frequency spacing at the first excitation. If the phases of the two excitation signals upon generation and accordingly also at the place of origin of the passive intermodulation product are phase-coherent between the two excitations, then the phases of the passive intermodulation product at the place of origin of the passive intermodulation product are also phase-coherent relative to one another at both excitations.

Through difference formation of the measured phases of the two passive intermodulation products, which are obtained in the case of the two excitations of the distributed device under test, the phases of the generated passive intermodulation product at the place of origin of the passive intermodulation product cancel each other out and are not required for the calculation of the delay time of the passive intermodulation product between the place of origin of the passive intermodulation product and the place of the measuring device, and accordingly, for a determination of the place of origin. To determine the delay time of the passive intermodulation product from the place of origin to the place of the measuring device, the two phases and the two frequencies of the passive intermodulation product at the place of origin of the passive intermodulation product at the two excitations are required.

Additional phase changes of the generated passive intermodulation product resulting from the reflection and the transmission of the non-ideality of the distributed device under test are ignored, if the frequency changes between the two excitations are minimal.

Phase changes of the passive intermodulation products between the input terminal of the distributed device under test—in the case of the reflection of the passive intermodulation product at the place of origin—or respectively the output terminal of the distributed device under test—in the case of the transmission of the passive intermodulation product at the place of origin—and the measuring device are determined in a preliminary measurement and taken into consideration in calculating the delay time of the passive intermodulation product between the place of origin of the passive intermodulation product and the input or respectively output terminal of the distributed device under test.

BRIEF DESCRIPTION OF THE DRAWINGS

In the following section, the two embodiments of the method according to the invention and of the system according to the invention for determining the place of origin of passive intermodulation products in devices under test are explained in greater detail with reference to the drawings. The figures of the drawings are as follows.

DETAILED DESCRIPTION OF EXEMPLARY EMBODIMENTS OF THE INVENTION

Figure 1:
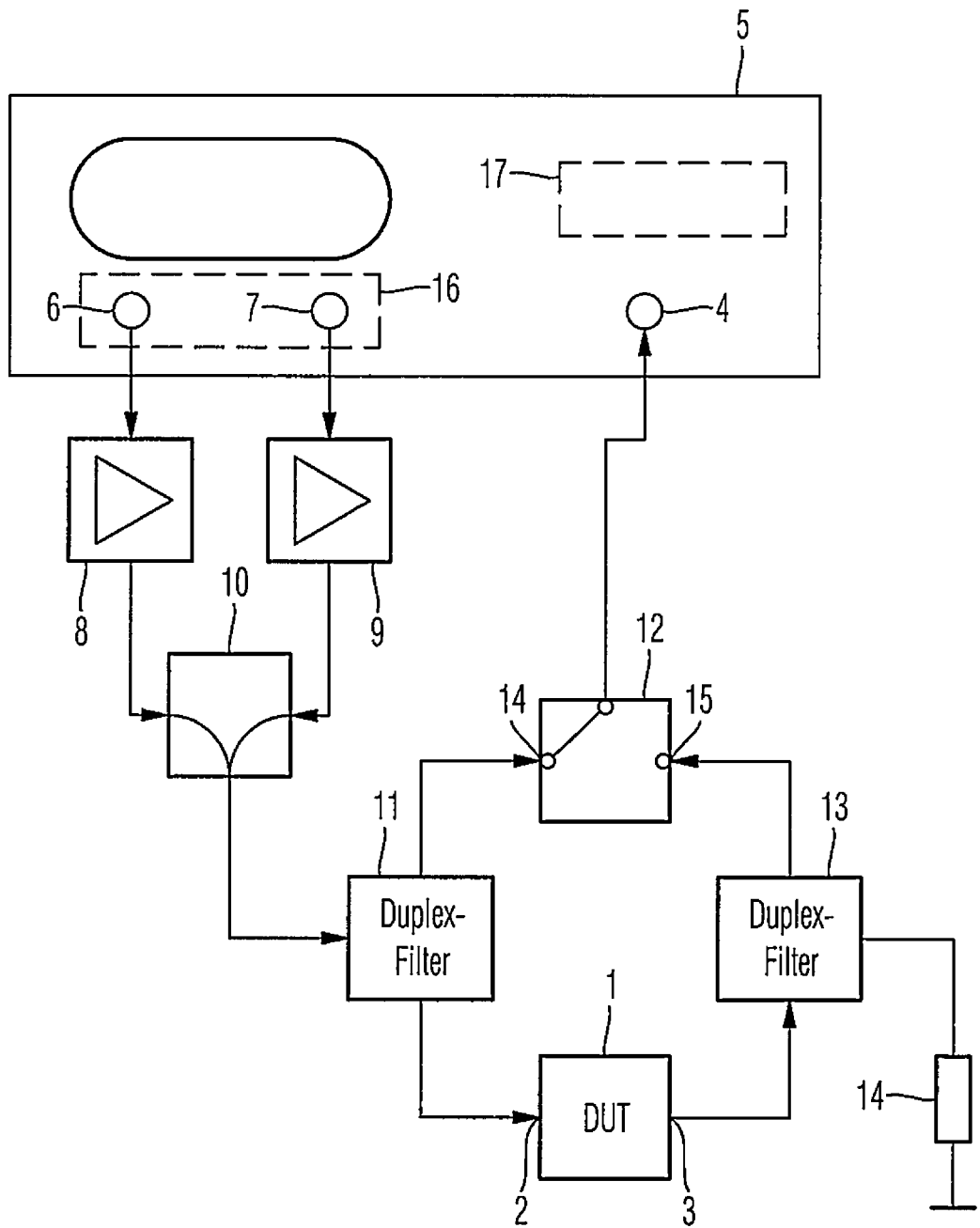
FIG. 1 shows a block-circuit diagram of a system according to an embodiment of the invention for determining the place of origin of passive intermodulation products in devices under test.
Figure 2:
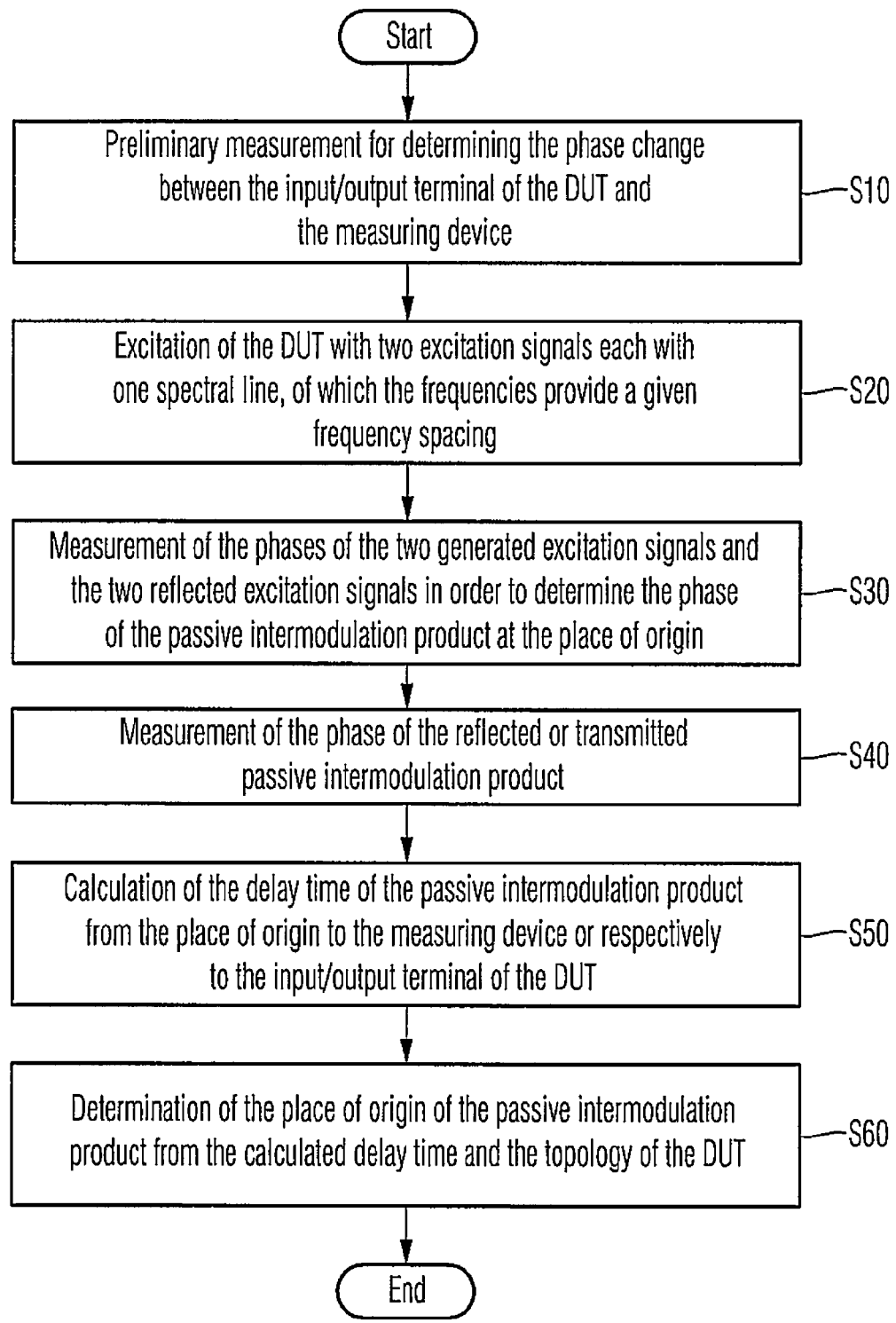
FIG. 2 shows a flowchart of a first embodiment of the method according to the invention for determining the place of origin of passive intermodulation products in devices under test.
Figure 3:
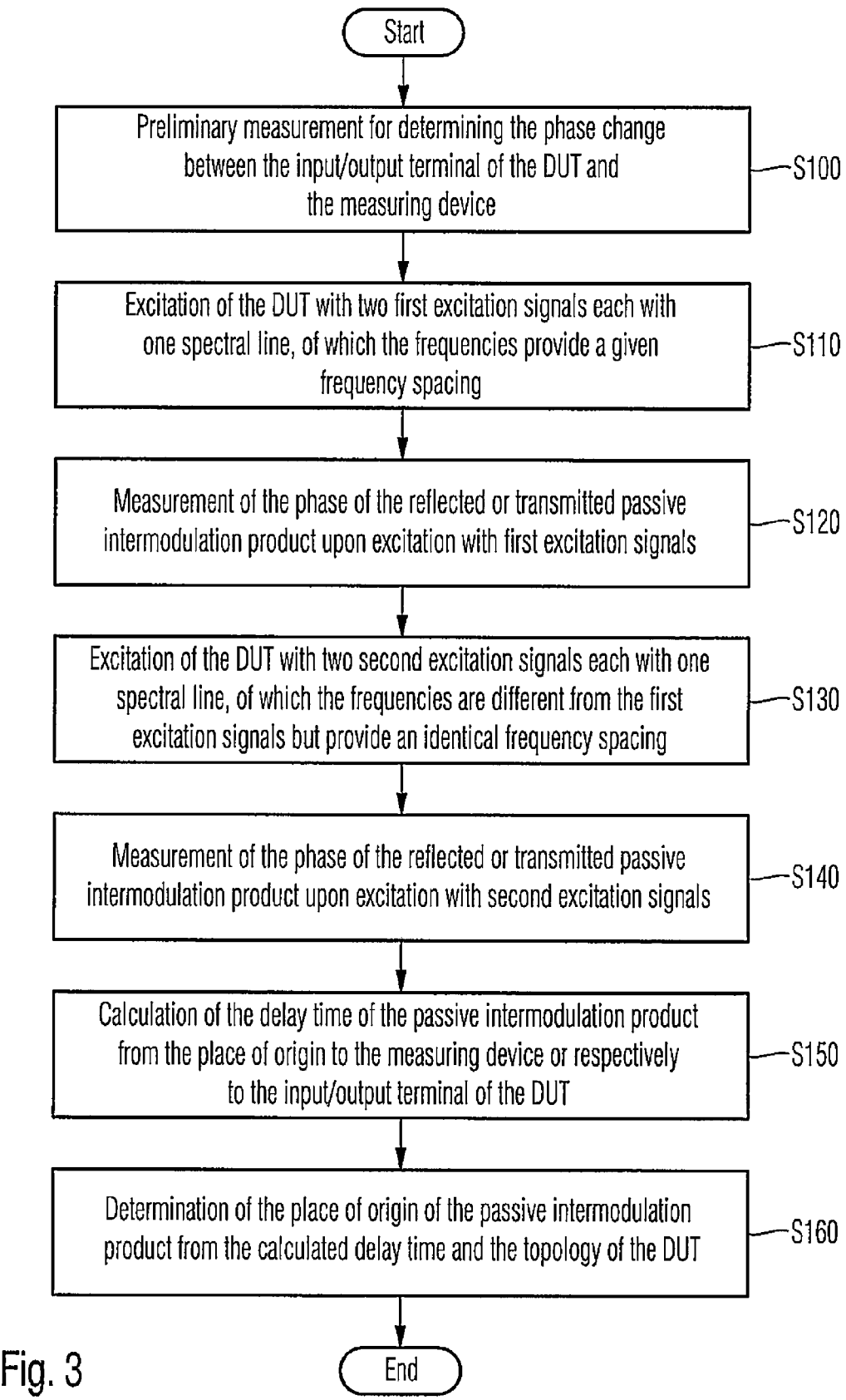
FIG. 3 shows a flowchart of a second embodiment of the method according to the invention for determining the place of origin of passive intermodulation products in devices under test.

Before embodiments of the method according to the invention and embodiments of the system according to the invention for determining the place of origin of passive intermodulation products in devices under test are explained in detail with reference to FIGS. 1 to 3, the mathematical basis required for understanding the invention will be explained below:

If a non-ideality in a distributed device under test is excited simultaneously by two excitation signals $x_1(t)$ and $x_2(t)$ according to equation (1A) and (1B), which each provide a purely sinusoidal signal characteristic, and therefore represent CW signals (continuous-wave), and accordingly each provide a single spectral line, of which the frequencies $f_1$ and $f_2$ according to equation (1C) provide a given frequency spacing $\Delta f$, a passive, third-order intermodulation product $x_{IM3}(t)$ according to equation (3) among other things is obtained as a result of the nonlinear transmission behavior of this non-ideality according to equation (2).

$$x_1(t) = e^{j(2\pi f_1 \cdot t + \phi_1)} \quad (1A)$$

$$x_2(t) = e^{j(2\pi f_2 \cdot t + \phi_2)} \quad (1B)$$

$$g[x(t)] = k_0 + k_1 \cdot [x(t)] + k_2 \cdot [x(t)]^2 + k_3 \cdot [x(t)]^3 + \ldots \text{ with } x(t) = x_1(t) + x_2(t) \quad (1C)$$

$$f_1 = f_2 + \Delta f \quad (2)$$

$$x_{IM3}(t) = e^{j[(2 \cdot 2\pi f_1 - 2\pi f_2) \cdot t + 2 \cdot \phi_1 - \phi_2]} \quad (3)$$

The phase $\phi_{IM3Origin}$ of this passive, third-order intermodulation product at the place of origin is consequently obtained according to equation (4).

$$\phi_{IM3Origin} = 2 \cdot \phi_2 - \phi_1 \quad (4)$$

The phase $\phi_{IM3Meas}$ measured in a measuring device, of a passive, third-order intermodulation product, which is connected to the input or output terminal of the distributed device under test, is obtained according to equation (5), if it is assumed that the delay time between the place of origin of the passive intermodulation product and the measuring device is $\Delta t$.

$$\phi_{IM3Meas} = (2 \cdot 2\pi \cdot f_1 - 2\pi \cdot f_2) \cdot \Delta t + 2 \cdot \phi_1 - \phi_2 \quad (5)$$

The delay time $\Delta t$ of the passive intermodulation product between the place of origin of the passive intermodulation product and the measuring device is consequently obtained according to equation (6) from the phase $\phi_{IM3Meas}$ measured in the measuring device of the passive intermodulation product, the phase $\phi_{IM3Origin}$ of the passive intermodulation product at the place of origin of the passive intermodulation product and the frequency $2 \cdot f_1 - f_2$ of the passive intermodulation product.

$$\Delta t = \frac{\varphi_{IM3Meas} - \varphi_{IM3Origin}}{2 \cdot 2\pi \cdot f_1 - 2\pi \cdot f_2} \quad (6)$$

The phase change $\Delta\phi_{IM3DUT\_Meas}$, determined in a preliminary measurement, of the passive intermodulation product between the input or output terminal of the distributed device under test and the measuring device is taken into consideration according to equation (7) for the calculation of the delay time $\Delta t$ of the passive intermodulation product between the place of origin of the passive intermodulation product and the input or output terminal of the distributed device under test.

$$\Delta t = \frac{\varphi_{IM3Meas} - \Delta\varphi_{IM3DUT\_Meas} - \varphi_{IM3Origin}}{2 \cdot 2\pi f_1 - 2\pi f_2} \quad (7)$$

The phase $\phi_{IM3Origin}$ of the passive intermodulation product at the place of origin of the passive intermodulation product is determined by measuring the phases $\phi_1$ and $\phi_2$ of the two excitation signals $x_1(t)$ and $x_2(t)$ at the place of origin of the passive intermodulation product according to equation (8A) or (8B) as mid-phases between the phases $\phi_{1Generation}$ and respectively $\phi_{2Generation}$ of the two excitation signals $x_1(t)$ and $x_2(t)$ at the generation of the two excitation signals $x_1(t)$ and $x_2(t)$ and the phases $\phi_{1Meas}$ and respectively $\phi_{2Meas}$ of the two excitation signals $x_1(t)$ and $x_2(t)$ reflected at the place of origin of the passive intermodulation product in a measurement in a measuring device positioned at the place of generation.

$$\varphi_1 = \varphi_{1Generation} + \frac{\varphi_{1Meas} - \varphi_{1Generation}}{2} \quad (8A)$$

$$\varphi_2 = \varphi_{2Generation} + \frac{\varphi_{2Meas} - \varphi_{2Generation}}{2} \quad (8B)$$

If it is desirable to bypass the determination of the phase $\phi_{IM3Origin}$ of the passive intermodulation product at the place of origin of the passive intermodulation product, the distributed device under test is supplied for a second time with two purely sinusoidal excitation signals $x_1'(t)$ and $x_2'(t)$ according to equation (9A) and (9B), of which the frequencies $f_1'$ and $f_2'$ are different from the frequencies $f_1$ and $f_2$ of the two excitation signals $x_1(t)$ and $x_2(t)$ at the first excitation of the distributed device under test and of which the frequency spacing $\Delta f$ according to equation (10) is identical to the frequency spacing $\Delta f$ of the frequencies $f_1$ and $f_2$ of the two excitation signals $x_1(t)$ and $x_2(t)$ at the first excitation of the distributed device under test.

$$x_1'(t) = e^{j(2\pi f_1' \cdot t + \phi_1')} \quad (9A)$$

$$x_2'(t) = e^{j(2\pi f_2' \cdot t + \phi_2')} \quad (8A)$$

$$\Delta f = f_1' - f_2' = f_1 - f_2 \quad (10)$$

The passive, third-order intermodulation product $x_{IM3}'(t)$ generated upon the second excitation of the distributed device under test is accordingly obtained from equation (11).

$$x_{IM3}'(t) = e^{j[(2\cdot 2\pi f_1' - 2\pi f_2')\cdot t + 2\cdot \phi_1' - \phi_2']} \quad (11)$$

The phase $\phi_{IM3Origin}'$ of this passive, third-order intermodulation product at the place of origin in the case of the second excitation of the distributed device under test is consequently obtained according to equation (12).

$$\phi_{IM3Origin}' = 2\cdot\phi_2' - \phi_1' \quad (12)$$

Since phase coherence between the phases $\phi_1$ and $\phi_2$ of the two excitation signals is a prerequisite, the phase of the passive intermodulation product at the place of origin of the passive intermodulation product is also constant in the case of a change of the frequencies of the two excitation signals according to equation (13).

$$\phi_{IM3Origin} = 2\cdot\phi_2 - \phi_1 = \phi_{IM3Origin}' = 2\cdot\phi_2' - \phi_1' \quad (13)$$

The phase $\phi_{IM3Meas}'$ of the passive, third-order intermodulation product upon the second excitation of the distributed device under test in a measuring device, which is disposed at the same place as for the first excitation of the distributed device under test, is obtained according to equation (14). In this case, the delay time $\Delta t$ of the passive intermodulation product between the place of origin of the passive intermodulation product and the measuring device at the second excitation of the device under test corresponds, because of the identical distance between the place of origin and the measuring device, to the delay time $\Delta t$ of the passive intermodulation product between the place of origin of the passive intermodulation product and the measuring device at the first excitation of the device under test.

$$\phi_{IM3Meas}' = (2\cdot 2\pi\cdot f_1' - 2\pi\cdot f_2')\cdot \Delta t + 2\cdot\phi_1' - \phi_2' \quad (14)$$

If the difference is formed between the phase $\phi_{IM3Meas}$, measured in the measuring device, of the passive, third-order intermodulation product at the first excitation of the distributed device under test according to equation (5) and the phase $\phi_{IM3Meas}'$ measured in the measuring device of the passive, third-order intermodulation product at the second excitation of the distributed device under test according to equation (14), and if the phase coherence condition according to equation (13) is taken into consideration, the delay time $\Delta t$ of the passive intermodulation product between the place of origin of the passive intermodulation product and the measuring device is obtained, after a mathematical transformation, according to equation (15), which contains no terms for the phase of the passive intermodulation product at the place of origin of the passive intermodulation product.

$$\Delta t = \frac{\varphi_{IM3Meas} - \varphi_{IM3Meas}'}{(2\cdot 2\pi f_1 - 2\pi f_2) - (2\cdot 2\pi f_1' - 2\pi f_2')} \quad (15)$$

The phase changes $\Delta\phi_{IM3DUT\_Meas}$ and respectively $\Delta\phi_{IM3DUT\_Meas}'$, determined in a preliminary measurement, of the passive intermodulation product between the input or output terminal of the distributed device under test and the measuring device at the two excitations, which are different because of the different frequencies $2\cdot f_1 - f_2$ and respectively $2\cdot f_1' - f_2'$ of the two excitations, are taken into consideration according to equation (16) in calculating the delay time $\Delta t$ of the passive intermodulation product between the place of origin of the passive intermodulation product and the input or respectively output terminal of the distributed device under test.

$$\Delta t = \frac{\varphi_{IM3Meas} - \Delta\varphi_{IM3DUT\_Meas} -}{(2\cdot 2\pi f_1 - 2\pi f_2) - (2\cdot 2\pi f_1' - 2\pi f_2')} \quad (16)$$

$$\frac{(\varphi_{IM3Meas}' - \Delta\varphi_{IM3DUT\_Meas}')}{}$$

Given a knowledge of the topology of the distributed device under test, it is possible to draw inferences regarding the place of origin of the passive intermodulation product within the distributed device under test from the calculated delay time $\Delta t$ of the passive intermodulation product between the place of origin of the passive intermodulation product and the input or output terminal of the distributed device under test.

In the following section, the first embodiment of the method according to the invention for determining the place of origin of passive intermodulation products in devices under test is explained with reference to the flowchart in FIG. 2, and the system according to the invention for determining the place of origin of passive intermodulation products in devices under test is explained with reference to the block-circuit diagram in FIG. 1.

In a first method step S10, in a preliminary measurement, the phase change $\Delta\phi_{IM3DUT\_Meas}$ of the passive intermodulation product generated at a place of origin within the distributed device under test 1 (DUT: device under test) from the output terminal 2 or from the output terminal 3 of the distributed device under test 1 to the test input 4 of a measuring device 5, preferably a vectorial network analyzer, is determined at the frequency $2\cdot f_1 - f_2$ of the passive intermodulation product. For this purpose, in a signal source 16 integrated in the vectorial network analyzer 5, two purely sinusoidal excitation signals $x_1(t)$ and $x_2(t)$ with a spectral line at the frequency $f_1$ and $f_2$ are generated and output at the two outputs 6 and 7 of the vectorial analyzer 5.

After the amplification of the two excitation signals $x_1(t)$ and $x_2(t)$, respectively in an external signal amplifier 8 and 9, the two excitation signals $x_1(t)$ and $x_2(t)$ are combined in a signal combiner 10 to form a single excitation signal. In a subsequent first duplex filter 11, the generated excitation signal is routed to the input terminal 2 of the distributed device under test 1, while, in alternation with the latter, the passive intermodulation product reflected at the place of origin of the passive intermodulation product within the distributed device under test 1 is supplied to a first input 12 of a switch 12, of which the output is connected to a test input 4 of the vectorial network analyzer 5.

If the first duplex filter 11 routes the reflected passive intermodulation product to a first input 14 of a switch 12, and if the switch 12 connects its first input 14 connected to the first duplex filter 11 through to its output, the phase change $\Delta\phi_{IM3DUT\_Meas}$ of the reflected intermodulation product can be determined in the preliminary measurement in each case at the frequency $2\cdot f_1 - f_2$ of the passive intermodulation product from the input terminal 2 of the distributed device under test 1 to the test input 4 of the measuring device 5, by determining the phase of the reflected passive intermodulation product at the input terminal 2 of the distributed device under test 1 and simultaneously at the test input 4 of the vectorial network analyzer 5.

The measurement of the phase change $\Delta\phi_{IM3DUT\_Meas}$ of the transmitted passive intermodulation product from the output terminal 3 of the distributed device under test 1 to the test input 4 of the vectorial network analyzer 5 is determined in that the second duplex filter 13 connected to the output terminal 3 of the distributed device under test 1 connects the output terminal 3 of the distributed device under test 1 to a second input 15 of the switch 12, and the switch 12 connects its second input 15 to the test input 4. In order to measure the phase change $\Delta\phi_{IM3DUT\_Meas}$ of the transmitted, passive intermodulation product between the output terminal 3 of the distributed device under test 1 and the test input 4 of the vectorial network analyzer 5, the input terminal 2 of the distributed device under test 1 is supplied with two purely sinusoidal excitation signals $x_1(t)$ and $x_2(t)$ each with a spectral line at the frequency $f_1$ and $f_2$. In the case of the measurement of the reflected passive intermodulation product, the output terminal 3 of the distributed device under test 1 is connected via the second duplex filter 13 to the matching impedance 14.

In the next method step S20, the input terminal 2 of the distributed device under test 1 is excited with two excitation signals $x_1(t)$ and $x_2(t)$ generated in the vectorial network analyzer 5, according to equation (1A) and (1B), which each provide a single spectral line, of which the frequencies $f_1$ and $f_2$, according to equation (1C), provide a given frequency spacing $\Delta f$.

In the next method step S30, the phases $\phi_{1Generation}$ and respectively $\phi_{2Generation}$ of the two excitation signals $x_1(t)$ and $x_2(t)$ at the generation of the two excitation signals) $x_1(t)$ and $x_2(t)$ and the phases $\phi_{1Meas}$ and respectively $\phi_{2Meas}$ of the two excitation signals $x_1(t)$ and $x_2(t)$ reflected at the place of origin of the passive intermodulation product are measured at the identical measuring place, namely, the place of the signal generation, in order to calculate the phases $\phi_1$ and $\phi_2$ of the two excitation signals at the place of origin of the passive intermodulation product using these measured phases $\phi_{1Generation}$ and respectively $\phi_{2Generation}$, and $\phi_{1Meas}$ respectively $\phi_{2Meas}$ according to equation (8A) and (8B). With the phases $\phi_1$ and $\phi_2$ of the two excitation signals at the place of origin of the passive intermodulation product, the phase $\phi_{IM3Origin}$ of the passive, third-order intermodulation product at the place of origin is calculated according to equation (4).

In the next method step S40, the phase $\phi_{IM3Meas}$ of the passive, third-order intermodulation product is measured in the vectorial network analyzer 5, which is connected to the input or output terminal of the distributed device under test 1.

In the next method step S50, the delay time $\Delta t$ of the passive intermodulation product between the place of origin of the passive intermodulation product and the input or output terminal of the distributed device under test is calculated according to equation (7). The phase $\phi_{IM3Meas}$, measured in the vectorial network analyzer 5, of the passive intermodulation product; the calculated phase $\phi_{IM3Origin}$ of the passive intermodulation product at the place of origin; the determined phase change $\Delta\phi_{IM3DUT\_Meas}$ of the reflected passive intermodulation product from the input terminal 2 of the distributed device under test 1 to the test input 4 of the vectorial network analyzer 5, or respectively of the transmitted passive intermodulation product from the output terminal 3 of the distributed device under test 1 to the test input 4 of the vectorial network analyzer 5; and the frequency $2\cdot f_1-f_2$ of the passive intermodulation product are used for this purpose.

Finally, in the concluding method step S60, in a calculation unit 17 integrated in the vectorial network analyzer 5, the place of origin of the passive intermodulation product within the distributed device under test 1 is determined on the basis of the known topology of the distributed device under test 1 and the delay time $\Delta t$, calculated in the preceding method step S60, of the passive intermodulation product between the place of origin of the passive intermodulation product and the input or output terminal of the distributed device under test.

In the next section, the second embodiment of the method according to the invention for determining the place of origin of passive intermodulation products in devices under test is explained with reference to the flowchart in FIG. 3 in combination with the system according to the invention for determining the place of origin of passive intermodulation products in devices under test with reference to the block-circuit diagram in FIG. 1.

The preliminary measurement in the first method step S100 corresponds substantially to the preliminary measurement of method step S10 of the first embodiment of the method according to the invention. Since the distributed device under test 1 is supplied in two measurements with excitation signals with respectively different frequencies $f_1$ and $f_2$ and respectively $f_1'$ and $f_2'$, the passive intermodulation products generated in this context each provide different frequencies $2\cdot f_1-f_2$ and $2\cdot f_1'-f_2'$, which lead in each case to different phase changes $\Delta\phi_{IM3DUT\_Meas}$ and $\Delta\phi_{IM3DUT\_Meas}$ of the passive intermodulation product between the input or respectively output terminal of the distributed device under test and the measuring device. Accordingly, in the second embodiment of the method according to the invention, in two measurements respectively, the phase changes $\Delta\phi_{IM3DUT\_Meas}$ and $\Delta\phi_{IM3DUT\_Meas}'$ of the passive intermodulation product between the input or respectively output terminal of the distributed device under test and the measuring device must be implemented at the excitation of the distributed device under test 1 with excitation signals generated in a signal source 16 of the vectorial network analyzer 5 at the respective frequencies $f_1$ and $f_2$, and respectively $f_1'$ and $f_2'$.

The next method step S110 of the method according to the invention comprises, by analogy with method step S20 of the first embodiment of the method according to the invention, a first excitation of the distributed device under test 1 with excitation signals $x_1(t)$ and $x_2(t)$ generated in the signal source 16 of the vectorial network analyzer 5 at the frequencies $f_1$ and $f_2$.

The next method step S120 of the method according to the invention corresponds to the method step S30 of the first embodiment of the method according to the invention and comprises the measurement of the phase $\phi_{IM3Meas}$ of the reflected or transmitted passive, third-order intermodulation product in the vectorial network analyzer 5 at the first excitation of the distributed device under test 1.

In the next method step S130 of the method according to the invention, the distributed device under test 1 is supplied for a second time with the excitation signals $x_1'(t)$ and $x_2'(t)$ generated in the signal source 16 of the vectorial network analyzer 5 with spectral lines at the frequencies $f_1'$ and $f_2'$ according to equation (9A) and (9B). In this context, it should be borne in mind that during the frequency switching from the frequency $f_1$ to the frequency $f_1'$ and from the frequency $f_2$ to the frequency $f_2'$, the phase coherence is preserved, and accordingly, no phase jumps occur during the frequency switching. This can be realized with the assistance of the Secum-Trahenz method described in DE 10 2006 017 018 A1. That application is accordingly included within the present application through reference.

In the subsequent method step S140, the phase $\phi_{IM3Meas}'$ of the reflected or transmitted, passive, third-order intermodulation product is measured in the vectorial network analyzer 5 at the second excitation of the distributed device under test 1.

In the next method step S150, in a calculation unit 17 integrated within the vectorial network analyzer 5, the delay time $\Delta t$ of the passive intermodulation product between the place of origin of the passive intermodulation product and the input or output terminal of the distributed device under test is calculated according to equation (16). The phases $\phi_{IM3Meas}$ and $\phi_{IM3Meas}'$ of the passive intermodulation product, measured respectively in the vectorial network analyzer 5 at the two excitations of the distributed device under test 1; the phase change $\Delta\phi_{IM3DUT\_Meas}$ and $\Delta\phi_{IM3DUT\_Meas}'$ of the reflected intermodulation product, determined for the two excitations of the distributed device under test 1 from the input terminal 2 of the distributed device under test 1 to the test input 4 of the vectorial network analyzer 5, or respectively of the transmitted passive intermodulation product from the output terminal 3 of the distributed device under test 1 to the test input 4 of the vectorial network analyzer 5; and the frequencies $2 \cdot f_1 - f_2$ and $2 \cdot f_1' - f_2'$ of the passive intermodulation product at the two excitations of the distributed device under test 1 are used for this purpose.

Finally, in the concluding method step S160, the place of origin of the passive intermodulation product within the distributed device under test 1 is determined with reference to the known topology of the distributed device under test 1 and the delay time $\Delta t$ calculated in the previous method step S150 of the passive intermodulation product between the place of origin of the passive intermodulation product and the input or respectively output terminal of the distributed device under test.

The invention is not restricted to the embodiments presented. Instead of vectorial network analyzers, other phase-measuring measuring devices are also covered by the invention.

The invention claimed is:

1. A method for determining a place of origin of a passive intermodulation product by an analyzer, said method comprising:
exciting of a distributed device under test with two first excitation signals $(x_1(t), x_2(t))$ in a signal source of the analyzer, each with a single spectral line, of which frequencies $(f_1, f_2)$ provide a frequency spacing relative to one another and of which phases are phase coherent to each other,
measuring a phase of a first passive intermodulation product generated at the place of origin within the distributed device under test by nonlinear distortion from the first excitation signals $(x_1(t), x_2(t))$ in the analyzer,
calculating delay time of the first passive intermodulation product from the place of origin to a measuring device from a measured phase and frequency $(2 \cdot f_1 - f_2)$ of the first passive intermodulation product in a calculation unit integrated in the analyzer, and determining the place of origin of the passive intermodulation product from the delay time and a topology of the distributed device under test in the calculation unit integrated in the analyser,
wherein measuring the phase includes measuring $\phi_{IM3Meas}$.

2. The method according to claim 1, wherein the phase $(\phi_{IM3Origin})$ of the first intermodulation product is determined at the place of origin and taken into consideration in the calculation of the delay time.

3. The method according to claim 1, wherein, before determining the place of origin of the passive intermodulation product, the following method steps are implemented:
exciting of the distributed device under test with two second excitation signals $(x_1'(t), x_2'(t))$ each with a single spectral line, of which the frequencies $(f_1', f_2')$ are respectively different from the frequencies $(f_1, f_2)$ of the first excitation signal $(x_1(t), x_2(t))$ and provide a frequency spacing identical to the frequency spacing of the first excitation signals $(x_1(t), x_2(t))$, and
measuring the phase $(\phi_{IM3Meas}')$ of a second passive intermodulation product generated at the place of origin in the distributed device under test from the second excitation signals $(x_1'(t), x_2'(t))$ by nonlinear distortion.

4. The method according to claim 1, wherein the phase $(\phi_{IM3Meas}; \phi_{IM3Meas}, \phi_{IM3Meas}')$ of the first passive intermodulation product generated and reflected at the place of origin in the device under test, or respectively of the first and second passive intermodulation product reflected and generated at the place of origin in the device under test is measured.

5. The method according to claim 1, wherein the phase $(\phi_{IM3Meas}; \phi_{IM3Meas}, \phi_{IM3Meas}')$ of the first passive intermodulation product generated and transmitted at the place of origin in the device under test and of the first and second passive intermodulation product generated and transmitted at the place of origin in the device under test is measured.

6. The method according to claim 1, wherein a passive, third-order intermodulation product is measured.

7. The method according to claim 1, wherein, in a preliminary measurement, the phase change $(\Delta\phi_{IM3DUT\_Meas}, \Delta\phi_{IM3DUT\_Meas}')$ of the first and second excitation signals $(x_1(t), x_2(t), x_1'(t), x_2'(t))$ from the input or respectively output terminal of the device under test to the measuring device is measured and compensated in the measured phase $(\phi_{IM3Meas}, \phi_{IM3Meas}')$ of the first and second passive intermodulation product.

8. The method according to claim 2, wherein the phase $(\phi_{IM3Origin})$ of the first intermodulation product is determined at the place of origin by determining the phase $(\phi_{1\,Generation}, \phi_{2\,Generation})$ of the generated first and second excitation signal $(x_1(t), x_2(t))$ and the phase $(\phi_{1Meas}, \phi_{2Meas})$ of the reflected first and second excitation signal $(x_1(t), x_2(t))$ at the place of the signal generation.

9. The method according to claim 2, wherein, before determining the place of origin of the passive intermodulation product, the following method steps are implemented:
exciting of the distributed device under test with two second excitation signals $(x_1'(t), x_2'(t))$ each with a single spectral line, of which the frequencies $(f_1', f_2')$ are respectively different from the frequencies $(f_1, f_2)$ of the first excitation signal $(x_1(t), x_2(t))$ and provide a frequency spacing identical to the frequency spacing of the first excitation signals $(x_1(t), x_2(t))$, and
measuring the phase $(\phi_{IM3Meas}')$ of a second passive intermodulation product generated at the place of origin in the distributed device under test from the second excitation signals $(x_1'(t), x_2'(t))$ by nonlinear distortion.

10. The method according to claim 2, wherein the phase $(\phi_{IM3Meas}; \phi_{IM3Meas}, \phi_{IM3Meas}')$ of the first passive intermodulation product generated and reflected at the place of origin in the device under test, or respectively of the first passive intermodulation product and a second passive intermodulation product reflected and generated at the place of origin in the device under test is measured.

11. The method according to claim 3, wherein the measured phases $(\phi_{IM3Meas}')$ and the frequency $(2 \cdot f_1' - f_2')$ of the second passive intermodulation product are taken into consideration in determining the place of origin.

12. The method according to claim 3, wherein the phase $(2 \cdot \phi_1 - \phi_2)$ of the first passive intermodulation product at the place of origin of the passive intermodulation product is phase-coherent to the phase $(2 \cdot \phi_1' - \phi_2')$ of the second passive intermodulation product at the place of origin of the passive intermodulation product.

13. The method according to claim 3, wherein
the phase ($\phi_{IM3Meas}$; $\phi_{IM3Meas}$, $\phi_{IM3Meas}'$) of the first passive intermodulation product generated and reflected at the place of origin in the device under test, or respectively of the first passive intermodulation product and the second passive intermodulation product reflected and generated at the place of origin in the device under test is measured.

14. The method according to claim 4, wherein
a phase change of the first passive intermodulation product or respectively of the first and second passive intermodulation product resulting from the reflection is constant for all frequencies of the first and second excitation signal used.

15. The method according to claim 8, wherein,
before determining the place of origin of the passive intermodulation product, the following method steps are implemented:
exciting of the distributed device under test with two second excitation signals ($x_1'(t)$, $x_2'(t)$) each with a single spectral line, of which the frequencies ($f_1'$, $f_2'$) are respectively different from the frequencies ($f_1$, $f_2$) of the first excitation signal ($x_1(t)$, $x_2(t)$) and provide a frequency spacing identical to the frequency spacing of the first excitation signals ($x_1(t)$, $x_2(t)$), and
measuring the phase ($\phi_{IM3Meas}'$) of a second passive intermodulation product generated at the place of origin in the distributed device under test from the second excitation signals ($x_1'(t)$, $x_2'(t)$) by nonlinear distortion.

16. The method according to claim 8, wherein
the phase ($\phi_{IM3Meas}$; $\phi_{IM3Meas}$, $\phi_{IM3Meas}'$) of the first passive intermodulation product generated and reflected at the place of origin in the device under test, or respectively of the first passive intermodulation product and a second passive intermodulation product reflected and generated at the place of origin in the device under test is measured.

17. The method according to claim 11, wherein
the phase ($2\cdot\phi_1 - \phi_2$) of the first passive intermodulation product at the place of origin of the passive intermodulation product is phase-coherent to the phase ($2\cdot\phi_1' - \phi_2'$) of the second passive intermodulation product at the place of origin of the passive intermodulation product.

18. The method according to claim 11, wherein
the phase ($\phi_{IM3Meas}$; $\phi_{IM3Meas}$, $\phi_{IM3Meas}'$) of the first passive intermodulation product generated and reflected at the place of origin in the device under test, or respectively of the first passive intermodulation product and the second passive intermodulation product reflected and generated at the place of origin in the device under test is measured.

19. The method according to claim 12, wherein
the phase ($\phi_{IM3Meas}$; $\phi_{IM3Meas}$, $\phi_{IM3Meas}'$) of the first passive intermodulation product generated and reflected at the place of origin in the device under test, or respectively of the first passive intermodulation product and the second passive intermodulation product reflected and generated at the place of origin in the device under test is measured.

* * * * *